United States Patent
Knittel et al.

(10) Patent No.: US 11,092,104 B2
(45) Date of Patent: Aug. 17, 2021

(54) METHOD FOR DETERMINING AN AIR MASS IN AN INTERNAL COMBUSTION ENGINE

(71) Applicant: VITESCO TECHNOLOGIES GmbH, Hannover (DE)

(72) Inventors: Thorsten Knittel, Pentling (DE); Stephen Setescak, Pentling (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 469 days.

(21) Appl. No.: 16/079,474

(22) PCT Filed: Nov. 23, 2016

(86) PCT No.: PCT/EP2016/078596
§ 371 (c)(1),
(2) Date: Aug. 23, 2018

(87) PCT Pub. No.: WO2017/144132
PCT Pub. Date: Aug. 31, 2017

(65) Prior Publication Data
US 2021/0003089 A1 Jan. 7, 2021

(30) Foreign Application Priority Data
Feb. 24, 2016 (DE) .................. 102016202803.0

(51) Int. Cl.
*F02D 41/18* (2006.01)
*F02D 41/06* (2006.01)
*G01F 1/696* (2006.01)

(52) U.S. Cl.
CPC ........... *F02D 41/18* (2013.01); *F02D 41/064* (2013.01); *G01F 1/6965* (2013.01);
(Continued)

(58) Field of Classification Search
CPC .. F02D 41/18; F02D 41/064; F02D 2200/021; F02D 2200/04; F02D 2200/101;
(Continued)

(56) References Cited

U.S. PATENT DOCUMENTS 6,712,046 B2 * 3/2004 Nakamichi ........... F02D 41/222
123/479
6,736,121 B2 * 5/2004 Gopichandra ........ F01N 3/0814
123/688

(Continued)

FOREIGN PATENT DOCUMENTS

CN 1973124 5/2007
CN 101080561 11/2007
(Continued)

OTHER PUBLICATIONS

Office Action dated Sep. 4, 2020 issued in Chinese Patent Application No. 201680082584.9.

*Primary Examiner* — Freddie Kirkland, III
(74) *Attorney, Agent, or Firm* — Cozen O'Connor

(57) ABSTRACT

A method for determining a corrected air mass flow value in an engine having an air mass meter in its intake. The method includes determining a cold start condition of the engine at a first time when there is no air mass flow in the intake tract, producing a reference signal by the air mass meter at the first time, and determining an air mass flow offset from the reference signal, producing a measurement signal by the air mass meter at a second time, which is not equal to the first time, which is in an operating period of the engine, determining an air mass flow value from the measurement signal, and determining a corrected air mass flow value from the air mass flow offset and the air mass flow value.

12 Claims, 1 Drawing Sheet

(52) U.S. Cl.
CPC .... *F02D 2200/021* (2013.01); *F02D 2200/04* (2013.01); *F02D 2200/101* (2013.01)

(58) Field of Classification Search
CPC .... F02D 41/222; F02D 41/042; G01F 1/6965; G01F 1/68; Y02T 10/40
See application file for complete search history.

(56) References Cited

U.S. PATENT DOCUMENTS

| | | | | |
|---|---|---|---|---|
| 6,978,667 | B2* | 12/2005 | Hosya | F02D 41/187 |
| | | | | 73/114.34 |
| 7,444,852 | B2* | 11/2008 | Fokkelman | F02D 41/187 |
| | | | | 73/1.01 |
| 2003/0079725 | A1* | 5/2003 | Nakamichi | F02D 41/222 |
| | | | | 123/479 |
| 2004/0154387 | A1 | 8/2004 | Hosya | |

FOREIGN PATENT DOCUMENTS

| | | |
|---|---|---|
| CN | 101189423 | 5/2008 |
| CN | 104736978 | 6/2015 |
| DE | 39 10 676 | 10/1990 |
| DE | 199 27 674 | 12/2000 |
| DE | 101 33 526 | 1/2003 |
| DE | 10 2012 219 290 | 4/2014 |
| JP | 55-139939 | 11/1980 |
| JP | 2004-239105 | 8/2004 |
| JP | 2006-161625 | 6/2006 |

* cited by examiner

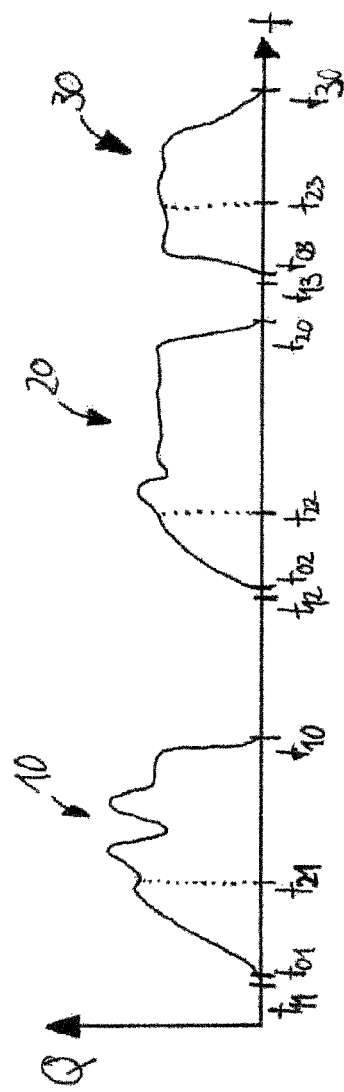

METHOD FOR DETERMINING AN AIR MASS IN AN INTERNAL COMBUSTION ENGINE

CROSS REFERENCE TO RELATED APPLICATIONS

This is a U.S. national stage of application No. PCT/EP2016/078596, filed on Nov. 23, 2016. Priority is claimed on German Application No.: DE102016202803.0, filed Feb. 24, 2016, the content of which is incorporated here by reference.

BACKGROUND OF THE INVENTION

1. Field of the Invention

The present invention relates to a method for determining an air mass supplied in an internal combustion engine and, in particular, to a method for correcting errors in the air mass determined in an internal combustion engine.

2. Description of Prior Art

Air mass meters are used in internal combustion engines to determine the mass of air drawn in and supplied to the cylinders of the internal combustion engine. Normally, the air mass meter is positioned between a turbocharger and an air filter arranged upstream in the inlet line. Air mass meters can determine the air mass by the "temperature difference method", for example. Moreover, there are known air mass meters that are based on keeping the temperature of a region of the air mass meter as constant as possible by a heating device and determining the air mass flow from the supply voltage of the heating device and the measured temperatures. Further methods for operating an air mass meter are measurement by a hot wire anemometer or ultrasound propagation time measurement.

In the course of operation, air mass meters can output signals that no longer fully correspond to the current air mass flow. Such faulty signals can increase with increasing time in operation, leading to control of the internal combustion engine, in particular of the exhaust gas recirculation, which is no longer optimal.

SUMMARY OF THE INVENTION

It is an object of one aspect of the present invention to provide a method for determining the current air mass in an internal combustion engine, by which the current air mass flow in an internal combustion engine can be determined as accurately as possible.

One aspect of the present invention is based on the concept, in the case of a cold start of the internal combustion engine, that is to say at a time at which there is no air mass flow in the inlet line, of performing a measurement by an air mass meter and converting this reference signal supplied by the air mass meter into a corresponding air mass flow offset. For example, faulty air mass meters produce a signal that indicates a low air mass flow value at the cold start measurement time. According to the method according to one aspect of the invention, however, the air mass flow offset determined can be taken into account and correspondingly corrected in the air mass flow value continuously detected by the air mass meter during the operation of the internal combustion engine. To be more precise, the air mass flow offset supplied by the air mass meter in the case of a cold start can be used for correction in the case of the further air mass values determined.

A method according to one aspect of the invention for determining a corrected air mass flow value of an internal combustion engine, which has an air mass meter arranged in an intake tract of the internal combustion engine, comprises determining a cold start condition of the internal combustion engine at at least one first time, at which there is still no air mass flow in the intake tract. The method according to the invention furthermore comprises producing at least one reference signal by the air mass meter at the at least one first time, and determining at least one air mass flow offset from the at least one reference signal of the air mass meter. Furthermore, the method according to the invention comprises producing a measurement signal by means of the air mass meter at at least one second time, which is not equal to the at least one first time and is in an operating period of the internal combustion engine, determining an air mass flow value on the basis of the measurement signal of the air mass meter, and determining the corrected air mass flow value from the at least one air mass flow offset and the air mass flow value.

The at least one first time is preferably shortly before a cold start of the internal combustion engine. For example, the at least one first time is in a time interval between activation of an ignition of the internal combustion engine and the beginning of starting of the internal combustion engine. That is to say that the reference signal of the air mass meter is delivered shortly before the starting of the internal combustion engine. At this first time, it is assumed that there is no air mass flow in the intake tract of the internal combustion engine and, consequently, the air mass flow value is zero.

Determination of the air mass flow values from the signals of the air mass meter involves using a predetermined characteristic curve of the air mass meter. For example, a predetermined characteristic map is stored in the air mass meter, e.g. in the form of a diagram in which the signal is plotted against the air mass flow. This signal characteristic is preferably at least partially nonlinear. For example, the signal characteristic is substantially similar to a root function.

In an advantageous embodiment, the method disclosed herein furthermore comprises determining an air mass flow correction value from the at least one air mass flow offset. A mean air mass flow offset, for example, is preferably determined as the air mass flow correction value from a plurality of air mass flow offsets determined at different first times. For example, the air mass flow correction value is the arithmetic mean of the plurality of air mass flow offsets.

According to another advantageous embodiment of the method disclosed herein, the corrected air mass flow value is determined by subtracting the air mass flow correction value from the air mass flow value. Based on this subtraction, the signals determined by the air mass meter and the air mass flow values calculated therefrom are corrected such that the air mass flow error present at the first time is taken into account and is incorporated into the evaluation of the signals of the air mass flow meter during the operation of the internal combustion engine. Consequently, the actual air mass flow value can be determined with greater accuracy, which can further improve the control of the internal combustion engine, especially in respect of control of exhaust gas recirculation.

In a preferred method for determining a corrected air mass flow value of an internal combustion engine, only a predetermined proportion of the air mass flow correction value is subtracted from the air mass flow value. In a subtraction of the complete mass flow correction value there is an overcompensation of the error. For this reason, it is advantageous if the predetermined proportion of the air mass flow correction value is in a range of approximately 50% to approximately 99%, in particular in a range of approximately 70% to approximately 95%.

In another preferred embodiment, the predetermined proportion of the air mass flow correction value depends on the sensitivity and/or the raw characteristic curve of the air mass meter. In an illustrative embodiment, calibration of the air mass meter can be followed by the production of a corresponding protocol for control of the internal combustion engine, which can indicate the associated predetermined proportion (in percent), dependent on the calibration, for the respective air mass meter.

The determination of the cold start condition of the internal combustion engine preferably comprises determining that the ignition of the internal combustion engine has been activated. In addition or as an alternative, the determination of the cold start condition of the internal combustion engine comprises determining that the speed of the internal combustion engine is zero, and/or determining that the temperature of the internal combustion engine (e.g. the oil or water temperature of the internal combustion engine) is below a predetermined threshold temperature. If, for example, the oil temperature of the internal combustion engine is within a range of around the ambient air temperature (e.g. ±10° C.), a cold start condition of the internal combustion engine can be determined.

In the context of the present disclosure, the expression "air mass flow value" denotes a value that indicates the current air mass flow in the intake tract using the unit [kg/h], for example. Furthermore, the expression "air mass flow offset" denotes an air mass flow value determined before a cold start of the internal combustion engine, which is taken into account in determining the air mass flow values determined during the operating period of the internal combustion engine. That is to say that the air mass flow offset represents a correction value or calibration value of the air mass meter when there is no air mass flow. The measurement signals and reference signals herein described, which the air mass meter produces, are signals that are converted into a corresponding air mass flow value by a separate control unit, e.g. the control unit of the internal combustion engine. For example, the measurement signals and reference signals of the air mass meter form a "SENT" (Single Edge Nibble Transmission) signal.

BRIEF DESCRIPTION OF THE DRAWINGS

Further features and embodiments of the method according to the invention can be found with reference to the single drawing below. The FIGURE shows, by way of example, a diagram in which an illustrative air mass flow of an internal combustion engine is plotted against time.

DETAILED DESCRIPTION OF THE PRESENTLY PREFERRED EMBODIMENTS

The FIGURE shows a diagram that illustrates, by way of example, three operating periods 10, 20, 30 of an internal combustion engine. During the three operating periods 10, 20, 30, different air mass flows and, consequently, different air mass flow values within the internal combustion engine occur.

The first operating period 10 indicates the time interval between times $t_{01}$, at which the speed of the internal combustion engine is still zero, and $t_{10}$, at which the speed of the internal combustion engine is zero again. In a similar way, the second and third operating periods 20, 30 indicate time intervals between times $t_{02}$ and $t_{20}$ or between times $t_{03}$ and $t_{30}$.

At a first time $t_{11}$, a cold start condition of the internal combustion engine is detected. For example, it is determined that the ignition of the internal combustion engine has been activated and thus that, at this first time $t_{11}$, there is now a current at an air mass meter arranged in an intake tract of the internal combustion engine. The air mass meter is designed to produce a signal that indicates the current air mass flow in the intake tract of the internal combustion engine. For example, the first time $t_{11}$ is approximately 200 ms before time $t_{01}$, at which the internal combustion engine is started.

Consequently, a first reference signal is produced by the air mass meter at the first time $t_{11}$ and is made available to the engine controller, for example. From the first reference signal produced at the first time $t_{11}$, the engine controller can produce a first air mass flow offset. The first air mass flow offset is an air mass flow value which represents the air mass flow value incorrectly indicated by the air mass meter. The air mass flow offset is usually indicated in the unit [kg/h].

During the first operating period 10, the air mass meter continuously produces measurement signals, which each indicate the current air mass flow within the intake tract of the internal combustion engine. For example, at a second time $t_{21}$, which is not equal to the first time $t_{11}$ and is in the first operating period 10, the air mass meter produces a measurement signal, which is made available to the controller of the internal combustion engine. From this measurement signal of the air mass meter, the controller determines a corresponding air mass flow value.

The controller can then determine a corrected air mass flow value using the previously determined first air mass flow offset and the determined current air mass flow value for the second time $t_{21}$. This is accomplished, for example, by subtracting the first air mass flow offset from the current air mass flow value.

After the internal combustion engine has been switched off, the method can produce a new reference signal shortly before another cold start of the internal combustion engine at a further first time $t_{12}$, from which the engine controller can determine a second air mass flow offset. The further first time $t_{12}$ is also shortly before the cold start of the internal combustion engine of the second operating period 20 at time $t_{02}$, e.g. 200 ms before time $t_{02}$. During the second operating period 20, the controller can continuously determine corrected air mass flow values, e.g. at a further second time $t_{22}$, taking account of the second air mass flow offset.

The method can proceed in a similar way during the third operating period 30 of the internal combustion engine, wherein a third reference signal, from which a third air mass flow offset is determined, is produced by the air mass meter at a further first time $t_{13}$. A corrected air mass flow offset can then be determined at the further second time $t_{23}$, taking account of the third air mass flow offset.

The method under consideration is preferably designed to determine an air mass flow correction value from the three air mass flow mass offsets, which have been determined at the three first times $t_{11}$, $t_{12}$, $t_{13}$ and to use this air mass flow correction value in the respective operating cycles 10, 20, 30, instead of the respective air mass flow offset, to determine the corrected air mass flow value at the second times $t_{21}$, $t_{22}$, $t_{23}$.

In another embodiment, the full air mass flow offset, i.e. 100% of the respective air mass flow offset, can be used in each case in determining the corrected air mass flow value at the second times $t_{21}$, $t_{22}$, $t_{23}$. However, this can lead to overcompensation of the error. For this reason, it is preferred that only a predetermined proportion of the respectively determined air mass flow offset be taken into account, e.g. subtracted, in determining the corrected air mass flow value. The predetermined proportion is approximately 80% of the respective air mass flow offset, for example.

In the same way, the method can be designed to take into account only a proportion of the air mass flow correction value determined from the plurality of air mass flow offsets in determining the corrected air mass flow value, e.g. approximately 90%.

In another advantageous embodiment of the method according to the invention, the air mass flow offsets determined can be evaluated in such a way that, if an air mass flow offset determined deviates by a predetermined value, e.g. by more than 50%, from the air mass flow correction value determined, this air mass flow offset determined is not incorporated into the continuous determination of the air mass flow correction value. Consequently, a deviating air mass flow offset of this kind is not stored. If the air mass flow correction value determined from a plurality of air mass flow offsets is approximately 5 kg/h, for example, but a new air mass flow offset determined is approximately 8 kg/h, the method can be designed not to incorporate this deviating air mass flow offset in the continuous averaging for the determination of the air mass flow correction value.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining a corrected air mass flow value in an internal combustion engine, which has an air mass meter arranged in an intake tract of the internal combustion engine, the method comprising:
   determining a cold start condition of the internal combustion engine at at least one first time, at which there is no air mass flow in the intake tract, wherein determining the cold start condition comprises:
      determining that a temperature of the internal combustion engine is below a predetermined threshold temperature, and/or
      determining that the temperature of the internal combustion engine is in a predetermined range around an ambient air temperature;
   producing at least one reference signal by the air mass meter at the at least one first time;
   determining at least one air mass flow offset from the at least one reference signal of the air mass meter;
   producing a measurement signal by the air mass meter at at least one second time, which is not equal to the at least one first time and is in an operating period of the internal combustion engine;
   determining at least one air mass flow value from the measurement signal of the air mass meter; and
   determining the corrected air mass flow value from the at least one air mass flow offset and the air mass flow value.

2. The method as claimed in claim 1, further comprising: determining an air mass flow correction value from the at least one air mass flow offset.

3. The method as claimed in claim 2, wherein the air mass flow correction value is determined from a plurality of air mass flow offsets, which have been determined at a plurality of first times.

4. The method as claimed in claim 2, wherein the corrected air mass flow value is determined by subtracting the air mass flow correction value from the air mass flow value.

5. The method as claimed in claim 4, wherein a predetermined proportion of the air mass flow correction value determined is subtracted from the air mass flow value.

6. The method as claimed in claim 5, wherein the predetermined proportion is in a range of at least one of:
   approximately 50% to approximately 99%, and
   approximately 70% to approximately 95%.

7. The method as claimed in claim 5, wherein the predetermined proportion depends on a sensitivity and/or a raw characteristic curve of an air mass meter arranged to produce the measurement signal.

8. The method as claimed in claim 1, wherein determining the cold start condition further comprises: determining that an ignition of the internal combustion engine has been activated, and/or determining that a speed of the internal combustion engine is zero.

9. The method as claimed in claim 1, wherein determination of the at least one air mass flow offset and/or determination of the air mass flow value are/is based at least in part on a predetermined characteristic curve of the air mass meter.

10. The method as claimed in claim 9, wherein the predetermined characteristic curve of the air mass meter is at least partially nonlinear.

11. The method as claimed in claim 2, further comprising:
   determining the air mass flow correction value based in part on the determined air mass flow offset if the determined at least one air mass flow offset deviates by a predetermined value from the determined air mass flow correction value.

12. The method as claimed in claim 1, wherein the measurement signal and reference signal are sent as a Single Edge Nibble Transmission signal.

* * * * *